(12) United States Patent
Wrubel

(10) Patent No.: US 7,281,420 B2
(45) Date of Patent: Oct. 16, 2007

(54) TIRE PRESSURE GAUGE

(75) Inventor: Daniel Wrubel, Grandville, MI (US)

(73) Assignee: EQAir, LLC, Grandville, MI (US)

( * ) Notice: Subject to any disclaimer, the term of this patent is extended or adjusted under 35 U.S.C. 154(b) by 0 days.

(21) Appl. No.: 11/355,821

(22) Filed: Feb. 16, 2006

(65) Prior Publication Data

US 2007/0095133 A1    May 3, 2007

Related U.S. Application Data

(60) Provisional application No. 60/730,739, filed on Oct. 27, 2005, provisional application No. 60/739,557, filed on Nov. 23, 2005.

(51) Int. Cl.
*G01M 17/02* (2006.01)
(52) U.S. Cl. ............... 73/146.3; 152/417; 73/146.8
(58) Field of Classification Search ............ 73/146, 73/146.2, 146.3, 146.8; 152/417
See application file for complete search history.

(56) References Cited

U.S. PATENT DOCUMENTS

| | | | |
|---|---|---|---|
| 1,785,110 A * | 12/1930 | Belz | ............ 137/229 |
| D212,385 S | 10/1968 | Yamada | |
| 4,998,438 A * | 3/1991 | Martin | ............ 73/146.8 |
| D353,113 S | 12/1994 | Cook-Martin | |
| D354,449 S | 1/1995 | Yoo | |
| 6,516,659 B2* | 2/2003 | Chen | ............ 73/146 |
| 2004/0035196 A1* | 2/2004 | Claussen et al. | ............ 73/146 |
| 2005/0217363 A1* | 10/2005 | Cousineau | ............ 73/146.8 |

* cited by examiner

*Primary Examiner*—Andre J. Allen
(74) *Attorney, Agent, or Firm*—Van Dyke, Gardner, Linn & Burkhart, LLP

(57) ABSTRACT

A tire pressure gauge includes a casing, conduits and a pressure indicator. The conduits are in fluid communication with one another, and are connectable to respective valves of tires of a vehicle. The pressure indicator is operable to provide an indication that is indicative of the pressure in at least one of the tires of the vehicle when at least one of conduits is interconnected with at least one valve of the tires. The tire pressure gauge may include an illumination source operable to automatically illuminate the pressure indicator in response to at least one triggering event that is indicative of the tire pressure gauge being interconnected with the valves of the vehicle tires. The tire pressure gauge may include an inlet port for connecting the tire pressure gauge and conduits to a pressurized supply line for inflating the tires.

24 Claims, 10 Drawing Sheets

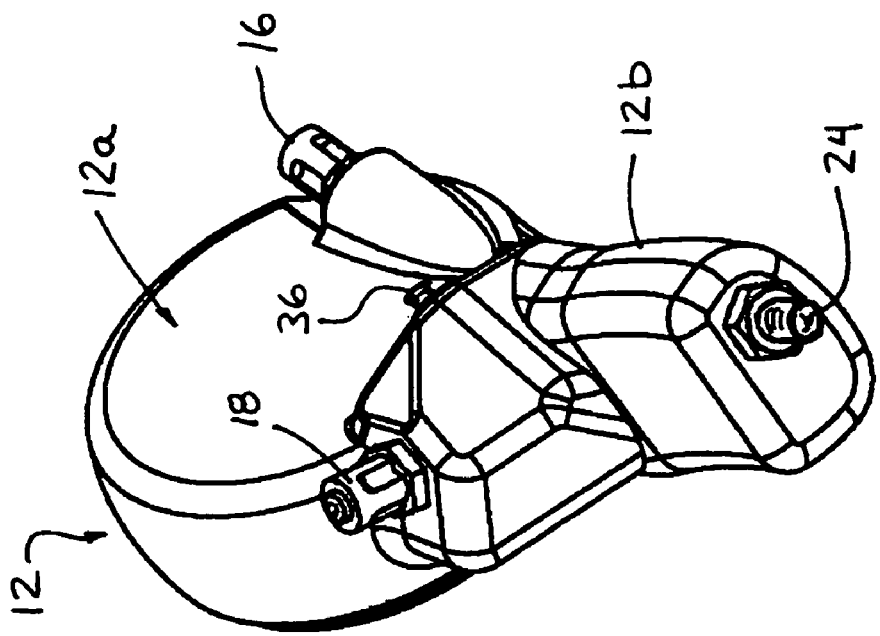
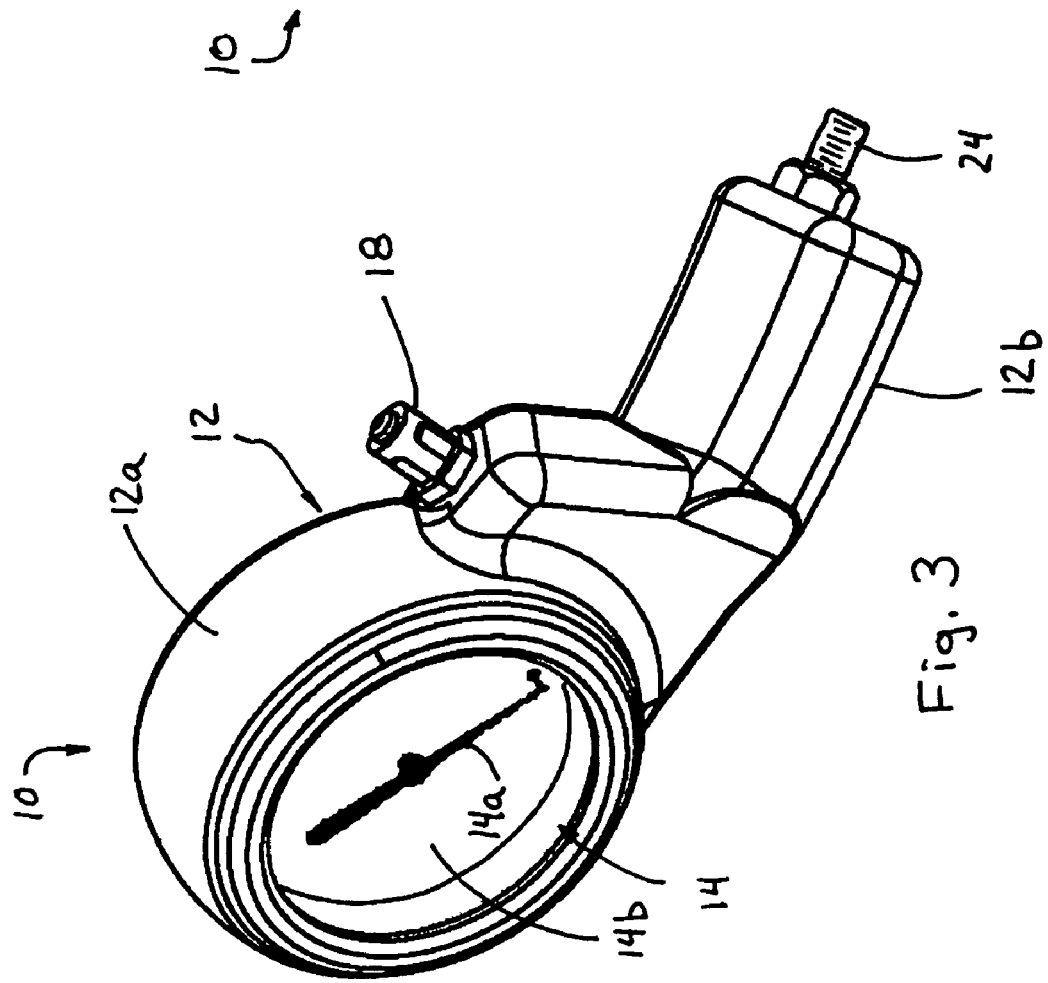

TIRE PRESSURE GAUGE

CROSS REFERENCE TO RELATED APPLICATIONS

The present application claims benefit of U.S. provisional applications, Ser. No. 60/730,739, filed Oct. 27, 2005; and Ser. No. 60/739,557, filed Nov. 23, 2005, which are hereby incorporated herein by reference in their entireties.

FIELD OF THE INVENTION

The present invention relates generally to tire pressure gauges for determining air pressure (or gas or fluid pressure) in the tires of a vehicle.

BACKGROUND OF THE INVENTION

Tire pressure gauges are typically hand held devices that may be engaged with a valve on a tire of a vehicle, whereby the tire pressure gauge provides a visible display or indication of the measured or detected tire pressure for the user to view or read. The display may be a dial type indicator with a needle that rotates to indicate the tire pressure, or may be a graded or marked stem that extends from the body of the tire pressure gauge a particular amount depending on the measured tire pressure. Digital displays are also known. Typically, such tire pressure gauges are suitable for measuring and/or indicating the tire pressure at a single vehicle tire at one time, whereby the user has to move from one tire to another to check the tire pressure of all of the tires of the vehicle.

It has been proposed to provide a tire pressure gauge with two connectors and hoses for connecting to or engaging the valves of two tires of a vehicle at the same time. Such dual gauges may function to provide fluid communication between the tires such that, if one of the tire pressures is higher than the other, the tire pressure between the two tires may be generally equalized to a pressure between the two tire pressures.

SUMMARY OF THE INVENTION

The present invention provides a tire pressure gauge that has two pressure ports or inlets for connecting to respective valves of two tires of a vehicle via respective conduits or hoses or lines or the like. The tire pressure gauge of the present invention may function to generally or substantially equalize the pressure in the two tires when the tire pressure gauge is connected to the tires, and provides a pressure readout or indicator so that a user may readily read or discern the tire pressure in the tires. The tire pressure gauge includes an illumination source at or near or behind the indicator or display face. The illumination source functions to illuminate the indicator or display face when the tire pressure gauge is connected to or in fluid communication with the valves of the vehicle tire, such as in response to a threshold pressure detection or the like at the tire pressure gauge.

According to an aspect of the present invention, a tire pressure gauge includes a casing, a pressure indicator and first and second connector ports for connecting to first and second conduits or hoses, respectively. The casing is formed to provide a handle for a user to hold the tire pressure gauge. The tire pressure gauge includes an illumination source that is operable to automatically illuminate the pressure indicator in response to a triggering event that is indicative of the tire pressure gauge being interconnected with or in fluid communication with the valves of the vehicle tires (such as when the conduits are connected to one or both of the connector ports and to one or more valves of the tires such that the pressurized air in one or both of the tires flows to the tire pressure gauge).

The triggering event may comprise at least one of (a) a threshold pressure level of pressurized air or gas or fluid being detected at the tire pressure gauge, (b) the first and second connector ports being connected to the respective hoses, and (c) the hoses being connected to respective valves at the tires of a vehicle. For example, the at least one triggering event may comprise a detection of a threshold pressure level of pressurized air or gas at the tire pressure gauge. The tire pressure gauge may include a pressure switch that is actuated when the threshold pressure level of pressurized air is detected, whereby the pressure switch automatically actuates the illumination source when the pressure switch is actuated. The pressure switch is deactuated, and thus the illumination source may be deactuated, when the pressure level of the pressurized air at the tire pressure gauge is below the threshold pressure level. The tire pressure gauge may include an ambient light sensor, and the illumination source may be automatically actuated in response to both the threshold pressure being detected (or other activating event) and an output of the ambient light sensor.

The connector ports may be in fluid communication with one another, whereby pressurized air in one tire may be transferred to the other tire if the pressure in the one tire is greater than the pressure in the other tire. The tire pressure gauge may include a relief valve to selectively vent or relieve some or all of the pressure in the hoses and tires, such as via a user input, such as a button or switch or the like, at the casing of the tire pressure gauge.

The tire pressure gauge preferably includes an inlet port for connecting to a pressurized air (or gas) supply hose. The inlet port may be in fluid communication with one or both connector ports, so that pressurized air or gas supplied at the inlet port (such as via a supply line or hose of an air compressor or the like) may be pumped or provided to the connector ports and to the vehicle tires connected to the connector lines or hoses to inflate the vehicle tires.

According to another aspect of the present invention, a tire pressure gauge for indicating a detected pressure level of air within tires of a vehicle includes a casing, a pressure indicator viewable at the casing, and first and second connector ports for connecting to first and second hoses, respectively. The casing may be formed to provide a handle for a user to hold the tire pressure gauge. The first and second connector ports are in fluid communication with one another, with the first and second hoses being connectable to respective valves of respective tires of a vehicle. The tire pressure gauge includes an inlet port for connecting to a pressurized supply hose, at least one valve located between the inlet port and the first and second connector ports, and a trigger at the handle. The inlet port is selectively in fluid communication with the first and second connector ports. The valve is openable and closable to control the flow of air or gas or fluid between the inlet port and the first and second connector ports. The trigger is selectively movable by a user to open and close the valve.

Optionally, the trigger may be pivotally attached at the handle. The trigger may be selectively pivoted toward the handle by a user to open the at least one valve, whereby pressurized air or gas or fluid flows from the inlet port through the tire pressure gauge and out the first and second connector ports for pressurizing the tires.

Therefore, the present invention provides a tire pressure gauge that has a pressure readout and that balances or equalizes the pressure between two tires, while providing for automatic illumination of the indicator to enhance viewing of the indicator during use of the tire pressure gauge. The illumination source thus may be automatically activated upon an activating event, such as a detection of a threshold pressure within or at the tire pressure gauge, so that the illumination source is only activated during use of the tire pressure gauge and when it may be desirable to view the indicator. The illumination source may be deactivated when the detected pressure reduces to below the threshold pressure (and when the tire pressure gauge is no longer in use) so that battery power usage is reduced. The illumination source may also only activate when an ambient light level at or generally surrounding the tire pressure gauge is below a threshold level. Thus, the illumination source is automatically activated only when it is desirable to illuminate the indicator or display of the tire pressure gauge, and is not activated when conditions are not suitable for illumination of the display. The tire pressure gauge of the present invention thus reduces usage of or conserves the batter or power source, so that the battery or power source may have an extended life cycle.

These and other objects, advantages, purposes and features of the present invention will become apparent upon review of the following specification in conjunction with the drawings.

BRIEF DESCRIPTION OF THE DRAWINGS

FIG. 3 is a lower front perspective view of the tire pressure gauge of FIGS. 1 and 2;

FIG. 4 is a lower rear perspective view of the tire pressure gauge of FIGS. 1-3;

DESCRIPTION OF THE PREFERRED EMBODIMENTS

Figure 1:
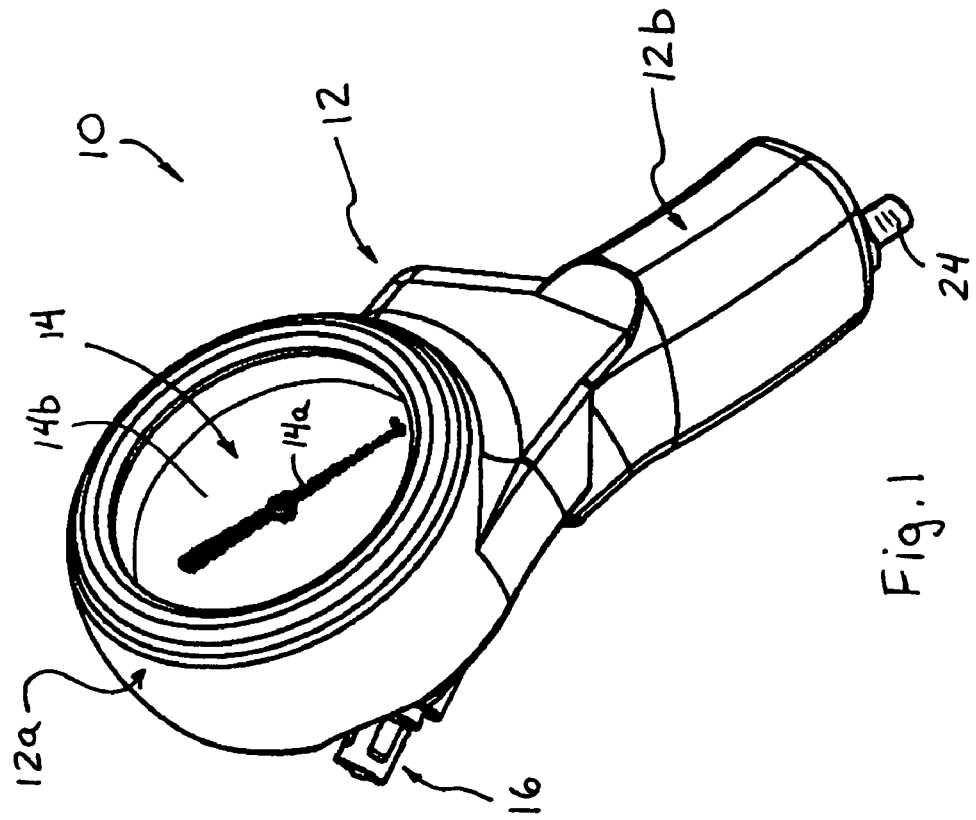
FIG. 1 is an upper front perspective view of a tire pressure gauge in accordance with the present invention.
Figure 2:
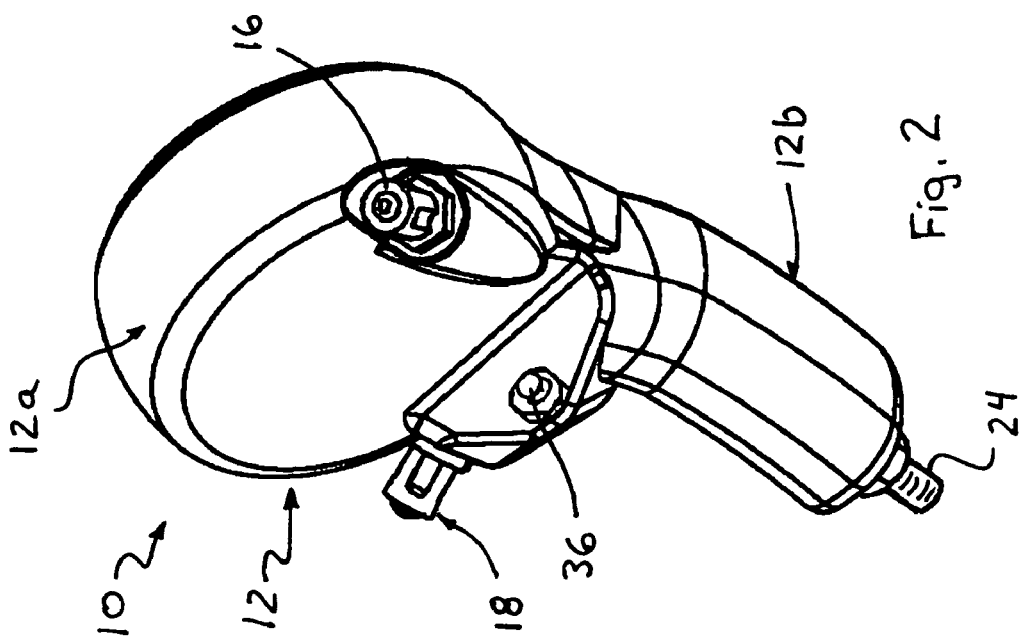
FIG. 2 is an upper rear perspective view of the tire pressure gauge of FIG. 1.
Figure 5:
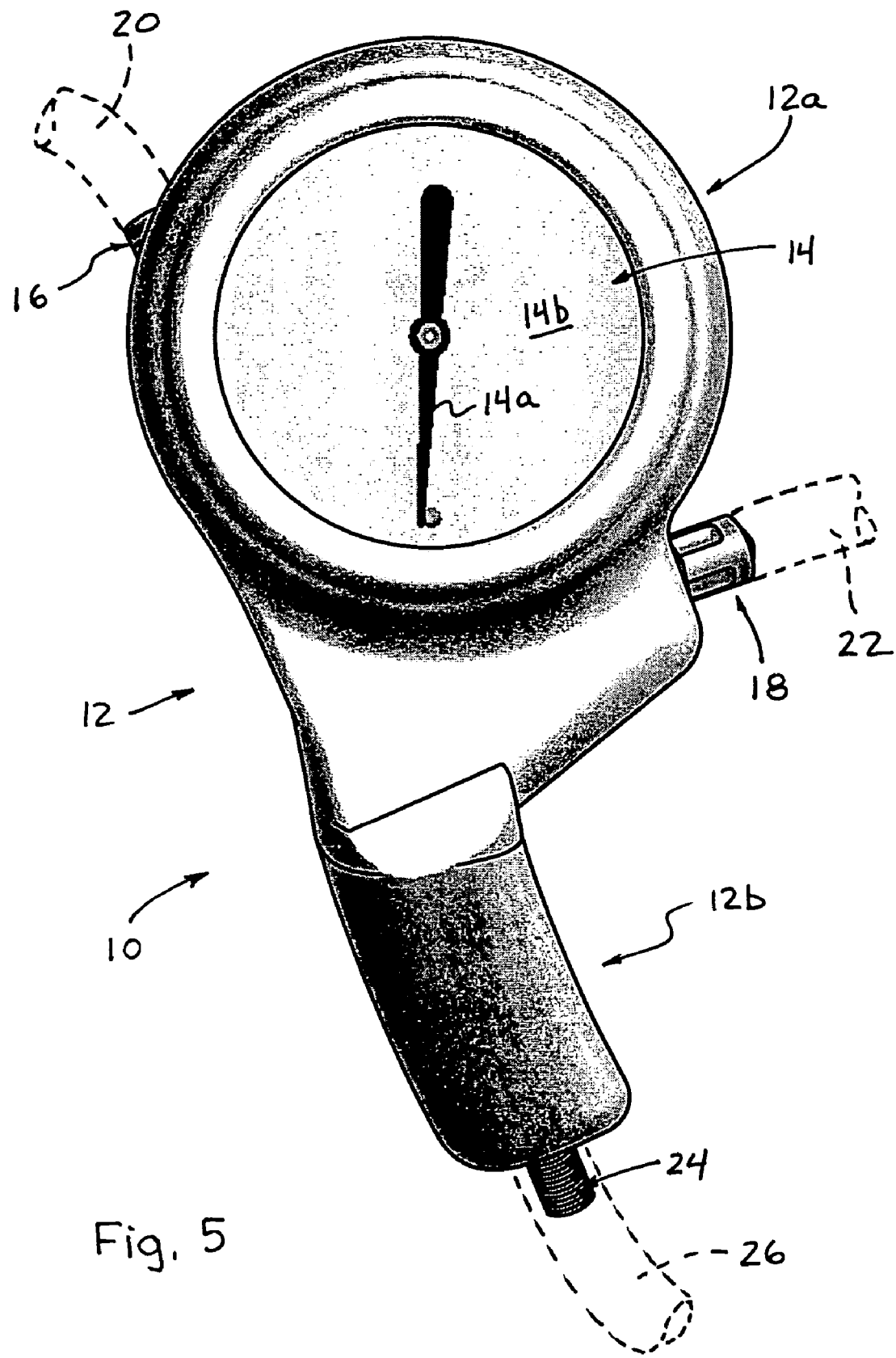
FIG. 5 is a front elevation of the tire pressure gauge of FIGS. 1-4.
Figure 6:
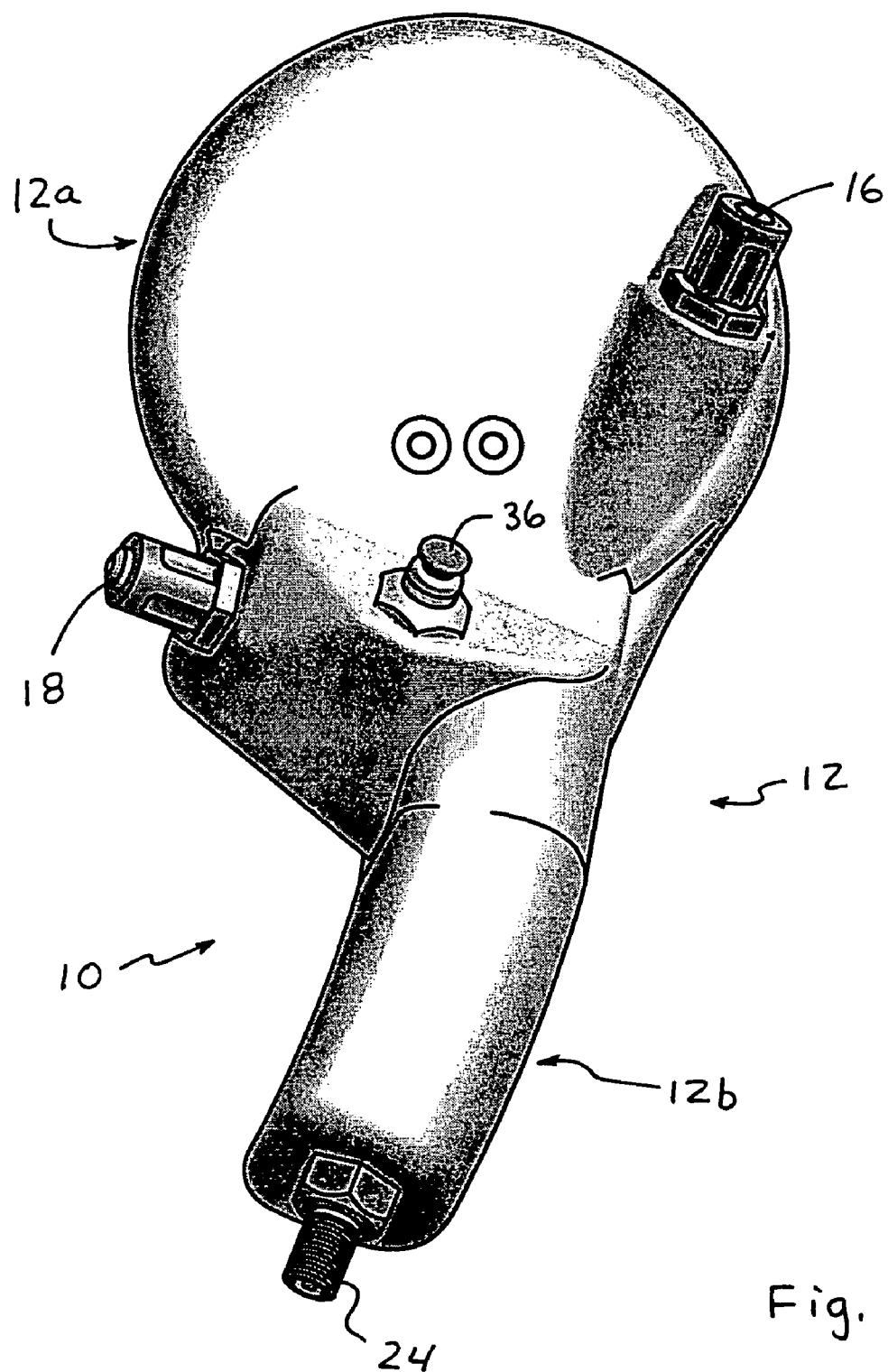
FIG. 6 is a rear elevation of the tire pressure gauge of FIGS. 1-5.
Figure 7:
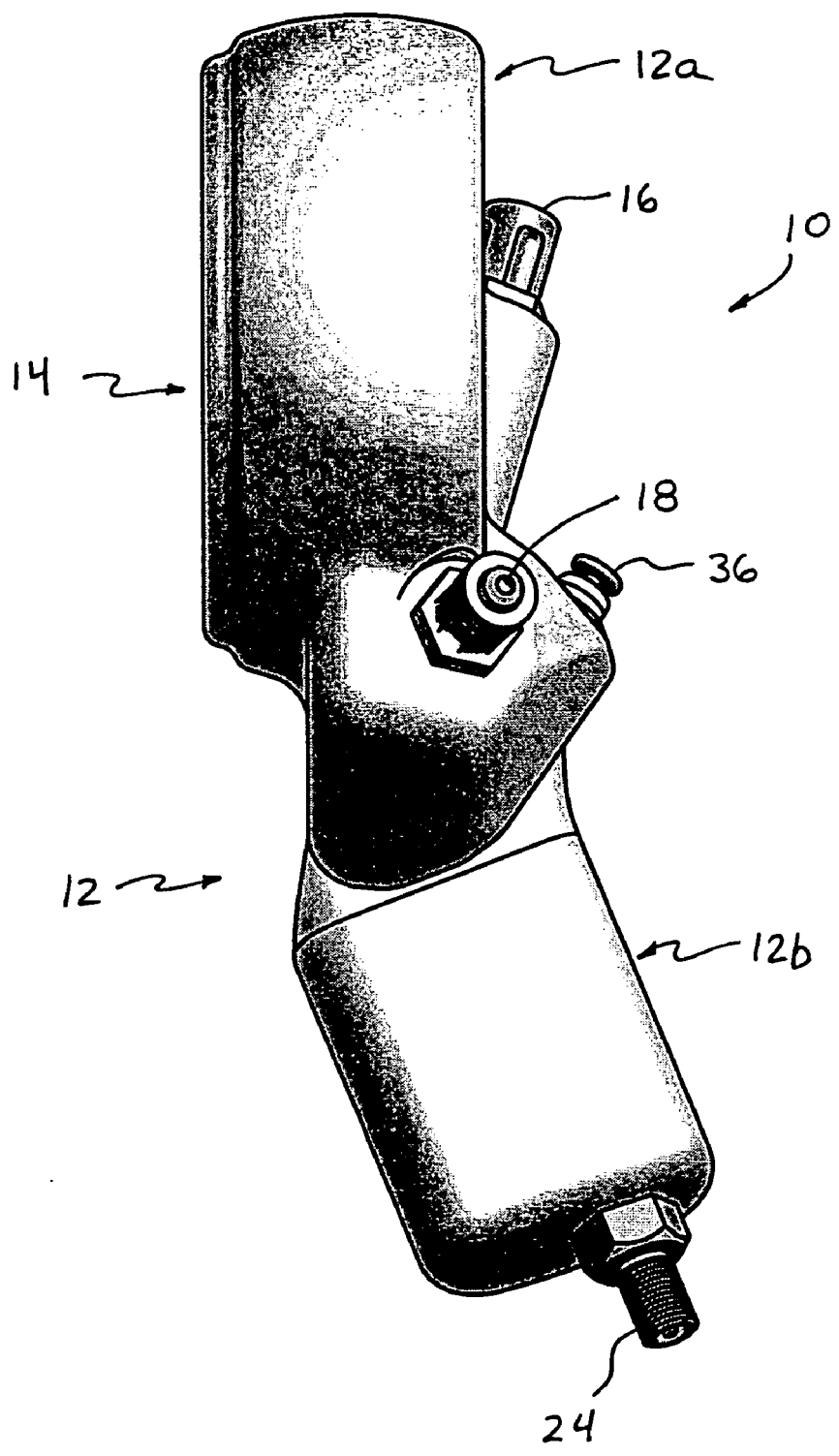
FIG. 7 is a side elevation of the tire pressure gauge of FIGS. 1-6.
Figure 8:
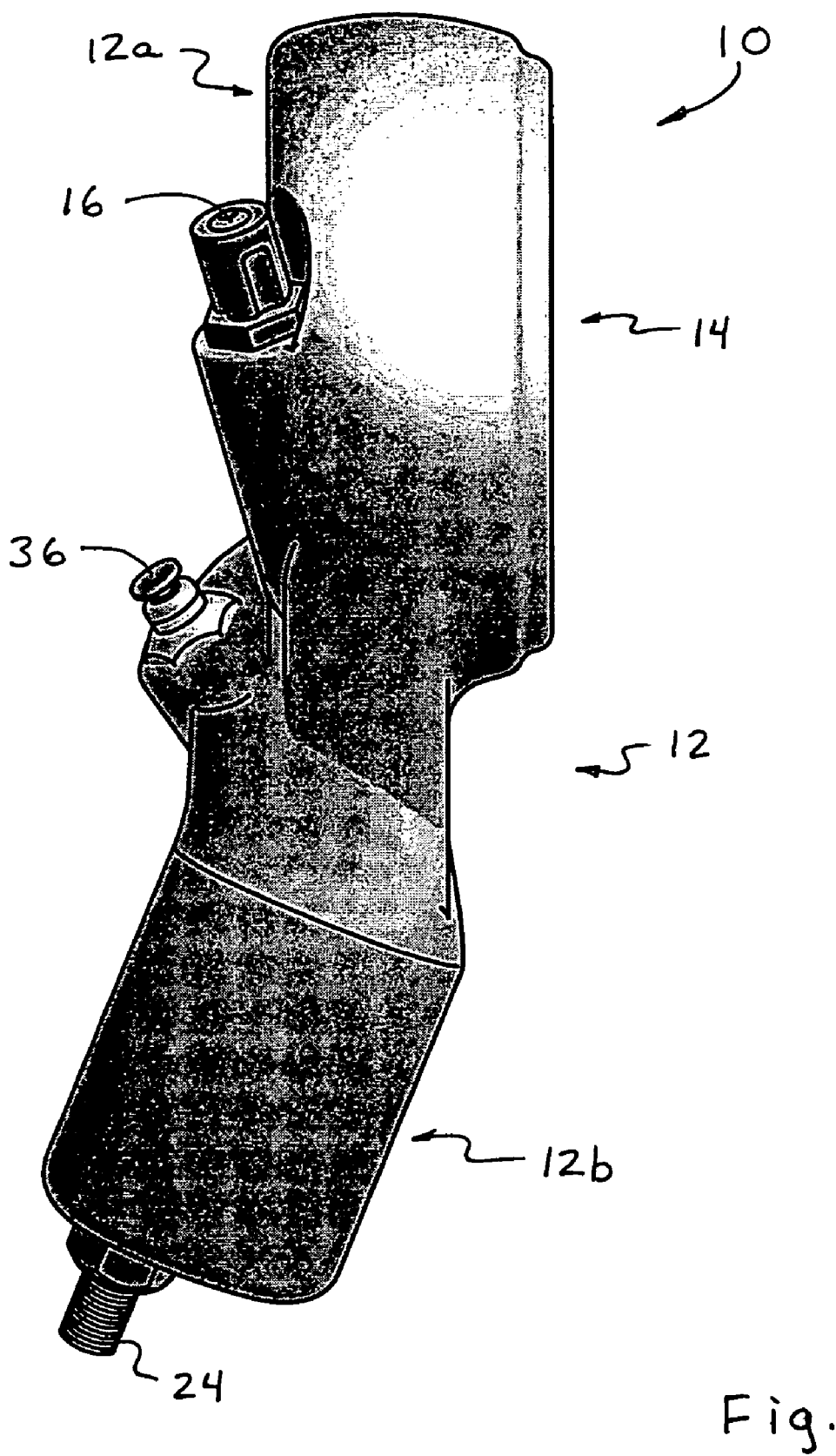
FIG. 8 is an opposite side elevation of the tire pressure gauge of FIG. 7.
Figure 9:
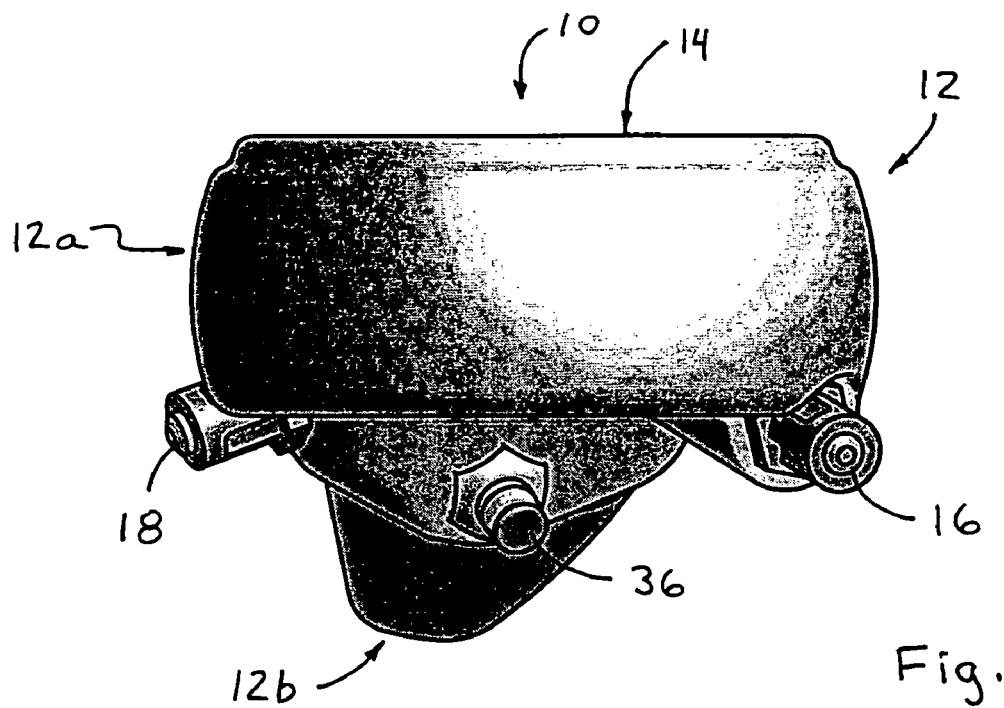
FIG. 9 is a top plan view of the tire pressure gauge of FIGS. 1-8.
Figure 10:
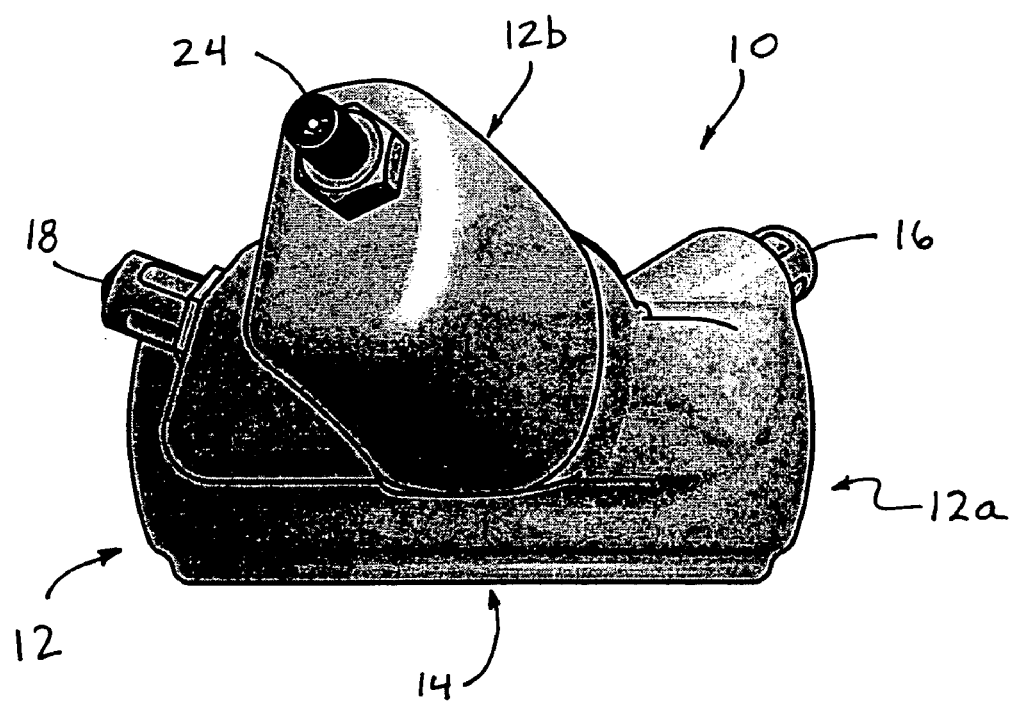
FIG. 10 is a bottom plan view of the tire pressure gauge of FIGS. 1-9.

Referring now to the drawings and the illustrative embodiments depicted therein, a tire pressure indicating device or gauge 10 includes a housing or casing or body 12 and a display or indicator 14 that functions to display or indicate a detected pressure in the tires of a vehicle. Tire pressure gauge 10 includes a pair of tire connector ports 16, 18 for connecting to respective conduits or lines or hoses 20, 22 (FIG. 5), which in turn are connectable to the valve or valve stem (not shown) of a respective vehicle tire (also not shown). Tire pressure gauge 10 includes an inlet port 24 for connecting to a supply hose 26 (FIG. 5) of a pressurized air supply (not shown) or other pressurized gas or fluid source or supply. The connector ports 16, 18 are connected to one another within or through the body 12 so as to provide fluid communication between the connector ports 16, 18 to generally equalize the tire pressures of the connected tires, as discussed below. Tire pressure gauge 10 also includes an illumination source 28 (FIG. 12), which is operable in response to the tire pressure gauge 10 being used, such as in response to pressurized air being detected at the tire pressure gauge or in response to the tire pressure gauge being connected to a valve of at least one vehicle tire, or in response to one or more other triggering events that is/are indicative of the tire pressure gauge being interconnected with the valves of the vehicle tires, as also discussed below.

Body 12 includes a display portion 12a and a handle or grasping portion 12b for a user to grasp and hold during use of tire pressure gauge 10. In the illustrated embodiment, display portion 12a is a generally circular-shaped portion for housing and displaying indicator 14, which is illustrated as a circular gauge with a needle 14a and a generally flat display face 14b, whereby the needle 14a pivots or rotates to indicate the detected pressure at one or both of the tires by pointing at demarcations (not shown) at the display face 14b. Handle portion 12b extends generally downward from display portion 12a and provides a generally cylindrical gripping portion for a user to wrap their hand at least partially around for easy holding of the tire pressure gauge during use. The body 12 of tire pressure gauge 10 thus provides an ergonomic grip for a person to grasp in their hand while the indicator is facing generally toward the user for easy viewing of the indicator during the tire pressure inflating or deflating or checking process. The body or casing may comprise any suitable material, such as a polymeric or plastic material or a metallic material, such as die cast aluminum or magnesium or the like, or a powder coated metallic material or the like, without affecting the scope of the present invention.

The indicator 14 is responsive to the pressure (such as air pressure or gas pressure) at and within the connector port or ports of the tire pressure gauge. The indicator needle may rotate or move in response to a pressure at or near the indicator that imparts the movement of the needle relative to the pressure, such as is known in the pressure gauge arts. The indicator may comprise an indicating needle that rotates in response to the pressure at the tire pressure gauge (as shown), or the indicator may comprise other means for indicating the tire pressure, such as a digital readout or a moving bar or other types of indicators or displays, without affecting the scope of the present invention. Optionally, the tire pressure gauge may include a pressure sensor that senses or detects or measures the pressure at the connector ports or within the gauge, and the indicator may be adjusted or moved in response to an output of the pressure sensor, without affecting the scope of the present invention.

In the illustrated embodiment, inlet or fill port 24 is located at the lower end of handle portion 12b and generally at an opposite end of the tire pressure gauge 10 from the display portion 12a of body 12. Inlet port 24 is connectable to a supply hose 26 that is in turn connected to a pressurized air source or supply, such as a compressor or the like, such that pressurized air may be provided to the tire pressure gauge for inflating the tires of the vehicle, as discussed below. The inlet port and its connection to an air supply may incorporate elements and means such as are known in the tire pressure gauge art, such that a detailed discussion of the inlet port and how it is connected to the air supply and how the air supply functions will not be included herein. Optionally, the inlet port may comprise a schrader valve or the like, or may comprise a quick connect/release type chuck or fitting or valve to readily connect and disconnect the tire pressure gauge from a corresponding or mating quick connect/release type chuck or fitting or valve at the end of a supply hose.

Connector ports 16, 18 protrude outwardly from the body 12 of tire pressure gauge 10 and are configured to connect to the respective air hoses 20, 22 via any known connection type or interface, such as a quick connect type of connection or threaded connection or the like. The connector ports thus may be readily connected to the air hoses, which in turn may be readily connected to the valve or valve stem at the respective tires of the vehicle, such as in a known manner. The connector ports 16, 18 may comprise a schrader valve or any other suitable connector or the like, without affecting the scope of the present invention. Optionally, the conduits or hoses 20, 22 may be substantially permanently affixed to or integral with the tire pressure gauge, such that the conduits extend from the casing or body for connecting to the valves of the vehicle tires, while remaining within the spirit and scope of the present invention.

Figure 11:
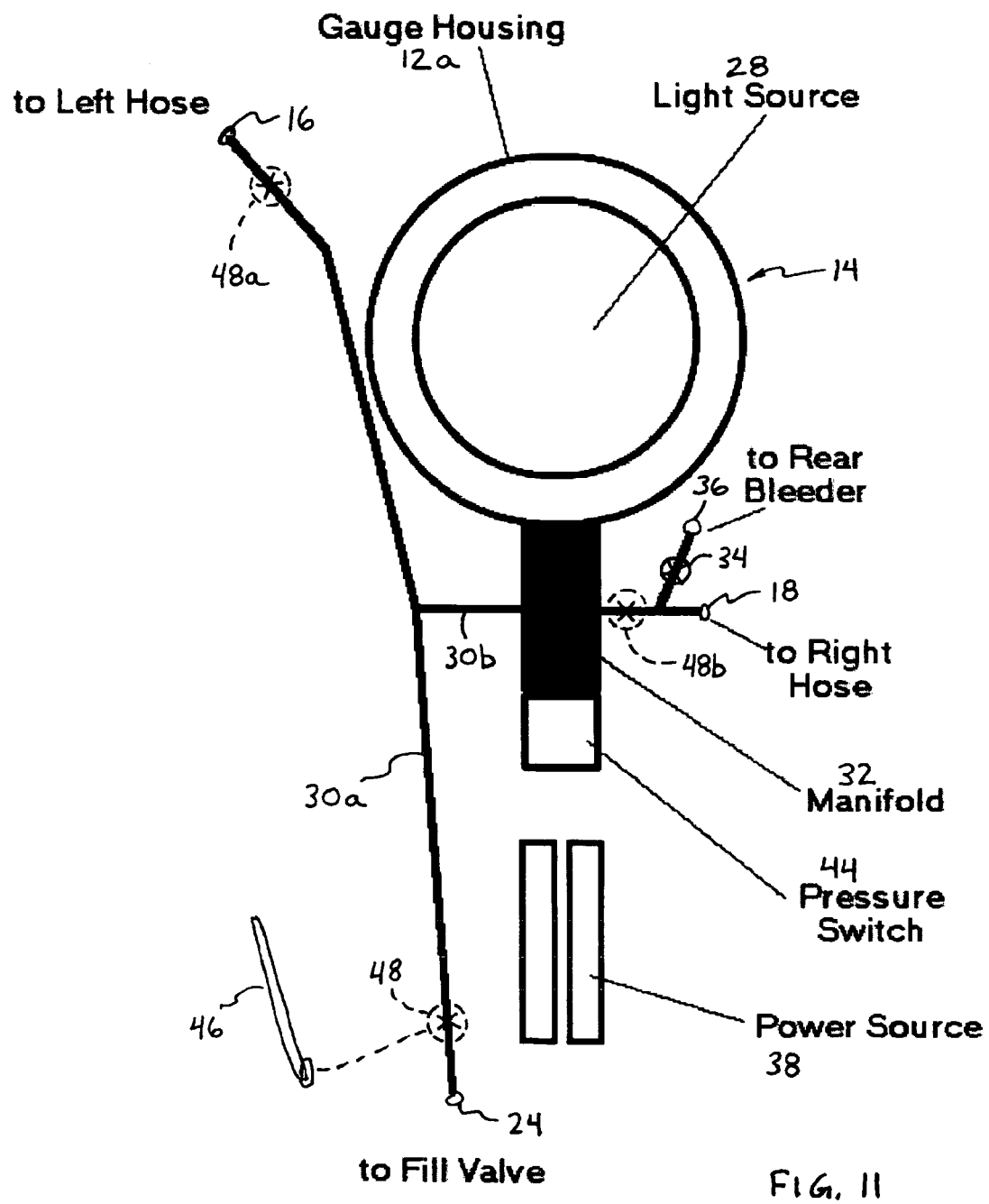
FIG. 11 is a flow schematic of the tire pressure gauge of the present invention, showing the conduits and valves within the body of the tire pressure gauge.

Within the casing or body 12, the connector ports and/or conduits may be connected to or in fluid communication with one another via one or more conduits or hoses or pipes or passageways within body 12. For example, and as shown in FIG. 11, the inlet or fill port 24 may be in fluid communication with connector port 16 via a conduit or hose or pipe 30a, while the connector port 18 may be connected to or in fluid communication with conduit 30a via a conduit or hose or pipe 30b. The tire pressure gauge 10 thus may substantially equalize the pressure in two tires when the connector ports 16, 18 are connected (such as via hoses 20, 22) to the valves or valve stems of respective tires. Conduit 30b is connected to or in fluid communication with a pressure manifold 32, at which the pressure of the air within the manifold may be detected or determined, such as via known pressure sensing means or pressure determining means or pressure indicating means or the like. The pressurized air within a tire thus may be determined and/or indicated at the indicator 14.

The connector ports 16, 18 may be biased to a closed or sealed state or condition, whereby air or gas cannot exit the ports when the ports are not connected to a hose or conduit and/or a vehicle tire valve (such as is similar to known valves). Thus, when only one connector port is connected to a vehicle tire, the other connector port will not relieve or vent the pressurized air, whereby the tire pressure gauge may function to indicate the pressure within the connected tire. When the conduits or hoses 20, 22 are connected to the connector ports 16, 18 and the opposite ends of the hoses 20, 22 are also connected to the valves or valve stems of the vehicle tires, pressurized air or gas may flow to and through the connector ports 16, 18 in either direction. For example, the air or gas may flow from one tire to the other (in situations where the pressure in one tire is greater than the pressure in the other tire) so as to balance the tire pressures, or the air or gas may flow to both tires (in situations where a pressurized air supply is connected to the inlet port 24 and activated) to inflate one or both of the tires.

In the illustrated embodiment, tire pressure gauge 10 includes a relief valve or vent or bleeder 34, which may be provided along one of the internal conduits 30a, 30b (such as at conduit 30b as shown in FIG. 11) to provide an exit or vent for relieving or reducing the pressure in the connected tire or tires (whereby the pressurized air or gas from one or both of the tires may flow into the conduits 30a, 30b and out the relief vent 34 to deflate the tires). The relief valve 34 may be selectively opened (such as via depressing a user input or button 36 at the exterior of body 12) to relieve or vent the pressurized air or gas within the conduits 30a, 30b to atmosphere.

Figure 12:
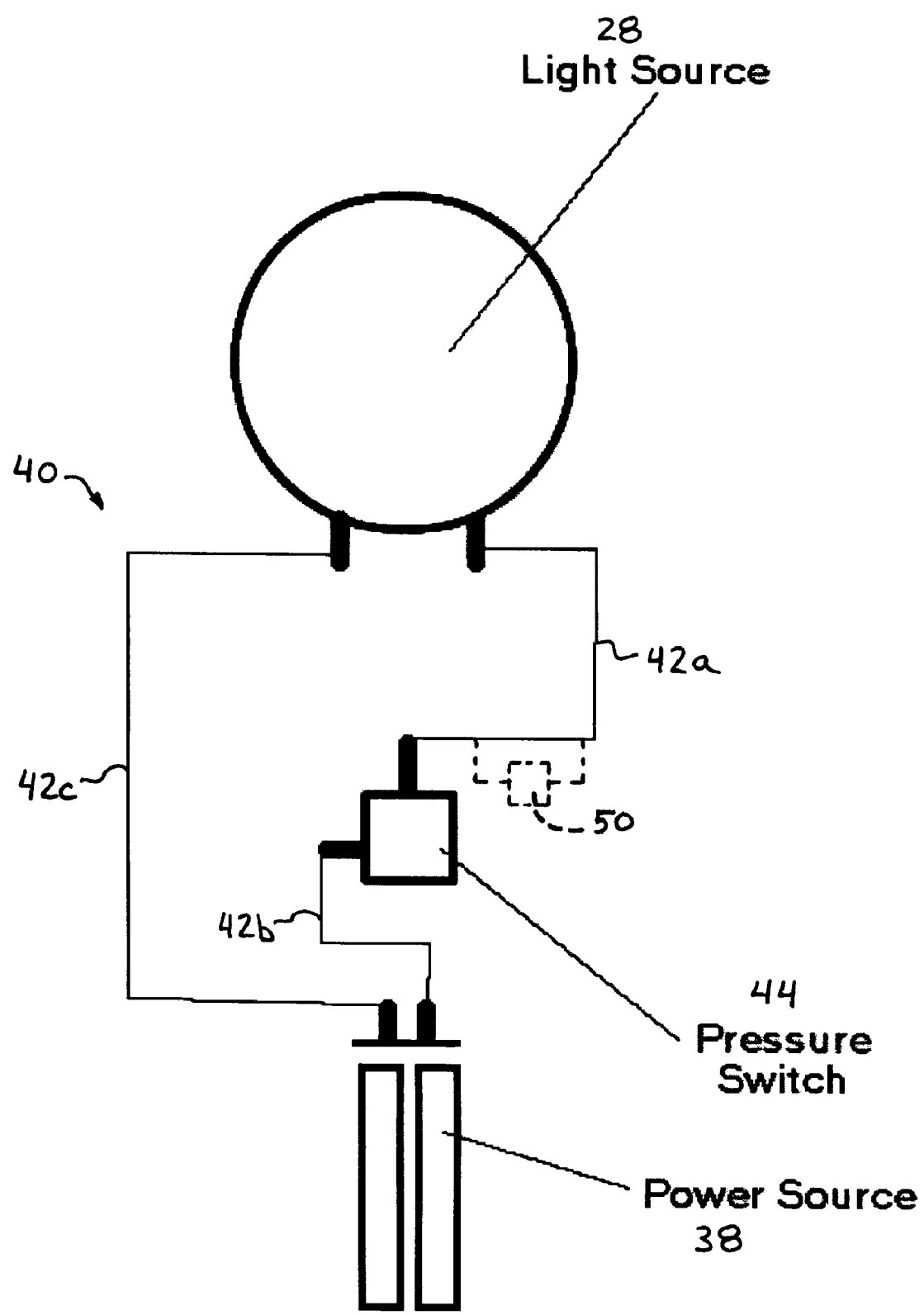
FIG. 12 is an electrical schematic of the electronic circuitry of the tire pressure gauge of the present invention.

As shown in FIG. 12, tire pressure gauge 10 includes illumination source 28, such as a light emitting diode (LED) or the like, which is positioned behind or at a perimeter of the indicator face 14b to illuminate the face 14b and/or the indicator pointer 14a so that a user of the tire pressure gauge may readily view the indicator 14 and discern the indicated pressure when using the tire pressure gauge 10 and when visibility conditions are low, such as in low light conditions, such as at nighttime or the like. Although shown as a single illumination source 28, one or more illumination sources or LEDs or the like may be provided at and within the tire pressure gauge to illuminate the indicator 14 during use of the tire pressure gauge 10.

Optionally, the illumination source or sources may be selectively activated or energized or adjusted to selectively illuminate only a portion of the indicator, such as the portion of the indicator face at which the indicator pointer or needle is pointing. For example, the illumination source may comprise an animated electroluminescent (EL) panel at the indicator face, whereby individual segments or portions, such as partial wedge-shaped portions, are selectively illuminated in response to the position or orientation of the indicator pointer. Thus, as the indicator moves or points to different tire pressures, the illumination source may adjust to illuminate a range of displayed pressures at which the indicator needle is generally pointing. The illumination source thus may be selectively activated or adjusted to provide illumination only or principally at the area where the illumination is needed or desired, such as at where the needle is pointing or at or within a range of where the needle is pointing (such as a band along the graduations of the indicator face that generally follows or tracks the movement of the needle as the detected pressure level changes).

Optionally, the color or intensity of the illumination provided by the illumination source may change depending on the pressure detected. For example, the color or intensity may change or the illumination source may intermittently illuminate or flash when the needle points to a desired or preset pressure level (which may be selected or input into the pressure gauge by a user or may be a predetermined pressure, such as, for example, about 35 psi, that is often used as a target pressure level for vehicle tires) so as to enhance the user's awareness that the detected pressure level is at or near the desired or appropriate pressure level, such as when a user is inflating or deflating the vehicle tires from an under-inflated/deflated or over-inflated condition. Optionally, the user may select the pressure at which the illumination source is actuated or adjusted or flashed, such as via a user input or the like, so that the desired pressure may be selectively changed (so that the user may change the tire pressure gauge to illuminate/flash at a different pressure, such as for example 55 psi, such as for trailer tires or the like). Optionally, multiple illumination sources may be independently or selectively actuated to indicate the pressure or approximate pressure at the tire pressure gauge (such as a plurality of LEDs arranged in a row or along an arc or the like). Optionally, the illumination source may back light the display area, and may back light an LCD screen, such as for an application with a digital display or the like.

Illumination source 28 thus may be activated in response to a triggering or activating event or device, such as a detection of a threshold pressure level at one or both of the connector ports 16, 18 or at or in the conduit or conduits 30a, 30b or at or in the manifold 32 within body 12 of tire pressure gauge 10. For example, and as shown in FIG. 12, tire pressure gauge 10 may include a power source 38, such as one or more batteries or the like, and may include wiring or circuitry 40 for activating and deactivating the illumination source 28. In the illustrated embodiment, circuitry 40 includes a pressure switch 44 that is electrically or conductively connected to the illumination source 28 and the power source 38 via conductive elements or wires 42a, 42b, respectively, while the illumination source 28 may also be electrically or conductively connected to the power source 38 via a conductive element or wire 42c. The pressure switch 44 thus functions to close a circuit (when the switch is actuated or closed) to activate the illumination source 28. As shown in FIG. 11, pressure switch 44 may be positioned at pressure manifold 32 and may be biased or defaulted to an open condition or state, and may close in response to the pressure within the manifold 32 reaching or exceeding a threshold pressure level, such as a predetermined amount of pressure above atmospheric pressure. When the pressurized air within the manifold 32 reaches or exceeds the threshold pressure level, the pressure switch 44 closes to activate the illumination source 28, and then opens (to deactivate illumination source 28) when the pressure within the manifold drops below the threshold pressure level (such as when the tire pressure gauge is disconnected from the vehicle tires or the like).

Optionally, the illumination source may only be activated when the ambient light level at the vehicle is below a threshold level (and also in response to the triggering event described above that is indicative of use of the tire pressure gauge). For example, the tire pressure gauge may include a photo sensor or light sensor 50 (FIG. 12) that is operable to sense light at the tire pressure gauge and to generate an output signal indicative of the sensed light level (such as by closing the circuit when the sensed ambient light is below a threshold level). Accordingly, when the sensed light level falls below a threshold level (such as typically occurs in the evening or nighttime), the tire pressure gauge may then function as described above, and may activate the illumination source in response to the triggering event indicative of use of the tire pressure gauge. However, when the sensed light level is above the threshold level (such as during daytime or at very well illuminated service stations or the like where the illumination source is not needed to view the indicator) the photo sensor and tire pressure gauge may override the circuitry or system (such as by opening the circuit) and thus the illumination source will not be automatically activated, regardless of the status of the triggering event or pressure switch. Thus, the detection of a low lighting condition by the light sensor may function as a first triggering event and the detection of a threshold pressure level by the pressure switch may function as a second triggering event, whereby the illumination source of the tire pressure gauge is only activated upon the occurrence of both triggering events. Such a dual trigger tire pressure gauge thus may substantially reduce battery power consumption by the tire pressure gauge so that it is more likely that battery power will be available when it is actually needed or desired to illuminate the indicator of the tire pressure gauge.

Optionally, illumination source 28 may also be selectively activated/deactivated via a user input, such as via a user pressing a button or switch (not shown) at the body of the tire pressure gauge or the like. If such a user input is implemented, it is desirable that the user input is biased or defaulted to an off position or condition (such as a biased push button that automatically disengages the electrical contact when released) so that the illumination source will be deactivated when the tire pressure gauge is not in use. The user input thus may override the circuitry of the tire pressure gauge and activate the illumination source irrespective of the status of the triggering event or events and/or the sensed ambient light level.

During use of tire pressure gauge 10, a user may hold or position the tire pressure gauge (which may already have the connector hoses 20, 22 already connected to the connector ports 16, 18) at a vehicle, such as at one side of the vehicle. Desirably, one of the connector hoses 20, 22 may be longer than the other connector hose, so that one of the hoses may extend around the vehicle or under/over the vehicle to a tire on the other side of the vehicle, while the other, shorter hose may connect to the tire at the side of the vehicle at which the user and the body 12 are located. The user may then connect the ends of the connector hoses to the valves of the selected tires of the vehicle to connect the tire pressure gauge to the tires of the vehicle.

Upon connection of the hoses 20, 22 to the tires, the tire pressure gauge is in fluid communication with the pressurized air or gas within the tires, such that the pressurized air enters and/or pressurizes the air within the conduits 30a, 30b and manifold 34 of the tire pressure gauge, and the indicator 14 indicates the measured or detected air pressure within the tire pressure gauge. When the pressure within the manifold 34 reaches the predetermined or threshold pressure level, the pressure switch 44 is activated or closed to automatically activate or energize the illumination source 28 at the indicator 14, in order to enhance viewing of the indicator during operation and use of tire pressure gauge 10.

The fluid communication between the connector ports 16, 18 and thus, between the tires, functions to substantially equalize the tire pressures within the connected tires. Optionally, the user may inflate or deflate the connected tires together. For example, the user may connect the supply port 24 to the supply hose 26 and may provide pressurized air to the tire pressure gauge 10 (via a pressurized air supply or source or compressor), whereby the pressurized air may flow to or may be in fluid communication with the tire or tires of the vehicle to inflate the tire or tires to a desired or appropriate level, or the user may depress the relief port input 36 to vent the conduits 30a, 30b via relief valve 34 to deflate the connected tire or tires to a desired or appropriate level.

Although shown and described as activating the illumination source in response to pressurized air within the tire pressure gauge reaching a predetermined or threshold level, it is envisioned that other sensing or triggering means or the like may function to trigger use of the tire pressure gauge, whereby the illumination source may be automatically activated and deactivated in response to such sensing or triggering means. For example, the illumination source may be automatically activated when the hoses 20, 22 are connected to the tires, either in response to the connection of the hoses 20, 22 to the connector ports 16, 18 (such as via metallic or conductive contacts at the connector ports closing a circuit when the conductive contacts conductively contact conductive contacts at the ends of the hoses when the hoses are connected to the connector ports), or in response to the connection of the hoses 20, 22 to the valves on the tires (such as via conductive contacts at the hose end connectors closing a circuit when the conductive contacts conductively contact the metallic valve stem or fitting at the vehicle tires), or in response to other sensing or circuit closing means. When such a connection is made and/or a threshold pressure is detected at the pressure gauge, the illumination source 28 is automatically activated to illuminate the indicator 14 of tire pressure gauge 10 (unless the tire pressure gauge includes the ambient light sensor and the sensed ambient light is above the threshold level).

Figure 13:
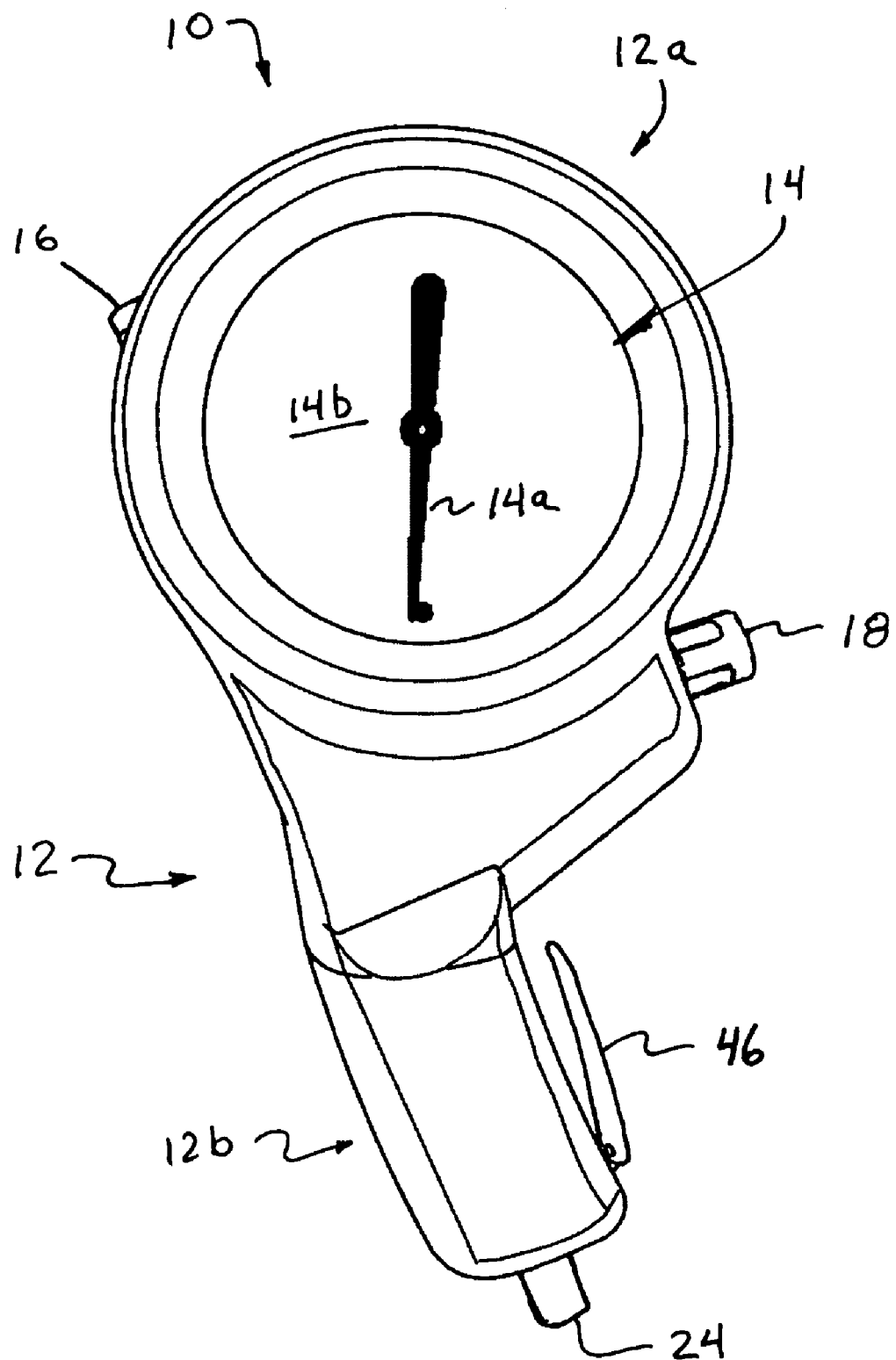
FIG. 13 is a front elevation of a tire pressure gauge in accordance with the present invention, with a user actuatable trigger at a handle portion of the tire pressure gauge.

Optionally, and as shown to FIGS. 11 and 13, the tire pressure gauge may include a user input or manual trigger 46, which may be pivotally or movably or adjustably mounted at the handle portion 12b of body 12, so that the trigger 46 may be readily and selectively pivoted or moved or adjusted by a user of the tire pressure gauge while the user is holding the handle portion 12b of body 12. Trigger 46 may be interconnected (either mechanically or electrically) with a valve 48 (FIG. 11) and may function to open the valve 48 when actuated (such as when squeezed toward the handle portion 12b by a user). The valve 48 and/or trigger 46 may be biased so as to close valve 48 when trigger 46 is released.

Trigger 46 and valve 48 function to allow air flow from the inlet port 24 (and thus from the pressurized air source) through the conduits 30a, 30b to provide pressurized air or gas to the ports 16, 18, and thus to the tires of a vehicle, when the trigger 46 is actuated or squeezed by the user. The tire pressure gauge thus may be attached to a hose from the pressurized air or gas source and may remain attached to the hose, so that pressurized air or gas is already at the tire pressure gauge when a user is ready to use the pressurized air source and tire pressure gauge. The valve 48 limits the flow of air or gas or fluid through the tire pressure gauge until the valve is opened by the trigger 46. Such a trigger and valve arrangement may be desired for service stations and the like, where the tire pressure gauge may remain connected to the air supply hose, which in turn is connected to a powered or activated pressurized air source or compressor. Thus, a user may pick up the tire pressure gauge and connect the hoses at ports 16, 18 to respective tires of a vehicle, and then may squeeze or actuate the trigger 46 to provide pressurized air or gas to the tires. When the trigger is released, the valve closes to limit or substantially preclude bleeding of air or deflating of the tires back through the inlet port so that the pressure is maintained within the tires. If the tire pressure gauge is disconnected from the pressurized air source (or the pressurized air source is deactivated), the trigger and valve may function to deflate the tires when the trigger is actuated or squeezed or depressed by a user.

Although shown in FIG. 11 as being located at the handle portion and generally at or near to the trigger 46, the valve or valves may be otherwise positioned elsewhere along the conduits 30a, 30b of the tire pressure gauge, without affecting the scope of the present invention. For example, and as also shown in FIG. 11, a valve 48a' may be located at or near outlet port 16, while a second valve 48b' may be located at or near outlet port 18, whereby both valves may be correspondingly opened and closed in response to actuation of a trigger element, which is preferably located at the handle portion of the body of the tire pressure gauge.

As can be seen in FIG. 13, the tire pressure gauge provides an ergonomical grasping or handle portion for a user to hold, with the trigger being located along the handle where a user may readily squeeze the trigger to inflate the tire or tires to the desired pressure. Similarly, the bleed valve or vent button or input 36 (FIGS. 2, 4 and 6-9) is located along the rear of the tire pressure gauge, where a user's thumb may be readily and comfortably located when the user is holding the tire pressure gauge. The user thus may comfortably hold the tire pressure gauge (and with the display or indicator facing the user and being readily viewed by the user) and may readily actuate the trigger (to inflate the tires) by squeezing the trigger 46 and/or actuate the venting valve by depressing the input 36 with their thumb. Optionally, the handle portion may include or provide a textured surface or soft touch surface, such as a stippled surface or such as a rubber or elastomeric grasping surface or the like, to enhance the comfort or feel of the handle portion to the user. The tire pressure gauge of the present invention thus provides an ergonomic gauge that is easy and comfortable to hold and use.

Although described above as being connectable to a pressurized air source for pressurizing tires of a vehicle via air flow through the tire pressure gauge, clearly the tire pressure gauge may be connected to other pressurized sources, such as a pressurized nitrogen source or other suitable gas or fluid, without affecting the scope of the present invention. Such pressurized sources of nitrogen may be desired in some applications, due to the reduced affect a change in temperature has on nitrogen (whereby the pressure in the tires may remain substantially constant even when there is a significant change in temperature at or in the tires). It is clear that the tire pressure gauge of the present invention may be used in connection with any suitable medium, such as air or gas or fluid or the like, while remaining within the spirit and scope of the present invention. The term "air" as used herein thus is not intended to limit the scope of the present invention to pressure gauges for use with pressurized air only, but rather is intended to mean any air or gas or fluid medium or composition that may be used to pressurize tires or inner tubes or the like.

Therefore, the tire pressure gauge of the present invention provides for a pressure readout and balancing or equalizing the pressure between two tires, while providing for automatic illumination of the indicator to enhance viewing of the indicator during use of the tire pressure gauge. The illumination source thus may be automatically activated upon detection of a threshold pressure within or at the tire pressure gauge, so that the illumination source is only activated during use of the tire pressure gauge and when it may be desirable to view the indicator. The illumination source may be deactivated when the detected pressure reduces to below the threshold pressure (and when the tire pressure gauge is no longer in use) so that battery power usage is reduced.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:
1. A tire pressure gauge for indicating a detected pressure level of air within tires of a vehicle, said tire pressure gauge comprising:
a casing, said casing being formed to provide a handle for a user to hold said tire pressure gauge;
first and second conduits extending from said casing, said first and second conduits being in fluid communication with one another, said first and second conduits being connectable to respective valves of respective tires of a vehicle;

a pressure indicator viewable at said casing, said pressure indicator being operable to provide an indication that is indicative of the pressure in at least one of the tires of the vehicle when at least one of said first and second conduits is connected to at least one of the valves of the tires; and an illumination source operable to automatically illuminate said pressure indicator in response to at least one triggering event, said at least one triggering event being indicative of the tire pressure gauge being interconnected with the valves of the vehicle tires.

2. The tire pressure gauge of claim 1 including first and second connector ports at said casing, said first and second connector ports being in fluid communication with one another and being configured to connect to an end of said first and second conduits, respectively.

3. The tire pressure gauge of claim 2 including an inlet port for connecting to a pressurized air supply, said inlet port being selectively in fluid communication with at least one of said first and second connector ports.

4. The tire pressure gauge of claim 3 including a trigger at said handle and at least one valve located between said inlet port and said first and second connector ports, said at least one valve being openable and closable to control fluid flow between said inlet port and said first and second connector ports, said trigger being selectively actuated to open and close said valve.

5. The tire pressure gauge of claim 2, wherein said at least one triggering event comprises at least one of (a) a threshold pressure level of pressurized air being detected at said tire pressure gauge, (b) said first and second connector ports being connected to the respective hoses, and (c) the hoses being connected to respective valves at the tires of a vehicle.

6. The tire pressure gauge of claim 1, wherein said at least one triggering event comprises a detection of a threshold pressure level of pressurized air at said tire pressure gauge.

7. The tire pressure gauge of claim 6 including a pressure switch that is actuated when the threshold pressure level of pressurized air is detected, said illumination source being automatically activated in response to actuation of said pressure switch.

8. The tire pressure gauge of claim 7, wherein said pressure switch is deactuated when the pressure level of the pressurized air at said tire pressure gauge is below said threshold pressure level.

9. The tire pressure gauge of claim 1 including an ambient light sensor, said illumination source being operable to automatically illuminate said pressure indicator in response to said at least one triggering event and in response to an output of said ambient light sensor.

10. The tire pressure gauge of claim 1, wherein said first and second conduits are configured to be selectively vented to atmosphere via a user input at said casing of said tire pressure gauge.

11. A tire pressure gauge for indicating a detected pressure level of air within tires of a vehicle, said tire pressure gauge comprising:

a casing;

a pressure indicator viewable at said casing;

first and second connector ports, said first and second connector ports being in fluid communication with one another within said casing, said first and second connector ports being configured to be interconnected to valves of respective tires of a vehicle via first and second hoses, respectively;

an inlet port for connecting to a pressurized supply hose, said inlet port being selectively in fluid communication with said first and second connector ports; and at least one valve located between said inlet port and said first and second connector ports, said at least one valve being selectively openable and closable via a user input to control fluid flow between said inlet port and said first and second connector ports.

12. The tire pressure gauge of claim 11, wherein said casing is formed to provide a handle for a user to hold said tire pressure gauge.

13. The tire pressure gauge of claim 12, wherein said user input comprises a trigger pivotally attached at said handle, said trigger being selectively pivoted toward said handle by a user to open said at least one valve.

14. The tire pressure gauge of claim 11 including an illumination source operable to automatically illuminate said pressure indicator in response to at least one triggering event that is indicative of said tire pressure gauge being interconnected with the valves of the vehicle tires.

15. The tire pressure gauge of claim 14, wherein said at least one triggering event comprises at least one of (a) a threshold pressure level of pressurized air being detected at said tire pressure gauge, (b) said first and second connector ports being connected to the respective hoses, and (c) the hoses being connected to respective valves at the tires of a vehicle.

16. The tire pressure gauge of claim 14, wherein said at least one triggering event comprises a detection of a threshold pressure level of pressurized air or gas at said tire pressure gauge.

17. The tire pressure gauge of claim 16 including a pressure switch that is actuated when the threshold pressure level of pressurized air is detected, said illumination source being automatically activated in response to actuation of said pressure switch.

18. The tire pressure gauge of claim 17, wherein said pressure switch is deactuated when the pressure level of the pressurized air or gas at said tire pressure gauge is below said threshold pressure level.

19. The tire pressure gauge of claim 14 including an ambient light sensor, said illumination source being operable to automatically illuminate said pressure indicator in response to said at least one triggering event and in response to an output of said ambient light sensor.

20. The tire pressure gauge of claim 11, wherein said first and second connector ports are selectively vented to atmosphere in response to a second user input at said casing of said tire pressure gauge.

21. A tire pressure gauge for indicating a detected pressure level of air within tires of a vehicle, said tire pressure gauge comprising:

a casing, said casing being formed to provide a handle for a user to hold said tire pressure gauge;

a pressure indicator viewable at said casing, said pressure indicator being indicative of a pressure at said tire pressure gauge;

first and second connector ports, said first and second connector ports being in fluid communication with one another within said casing, said first and second connector ports being configured to be interconnected to valves of respective tires of a vehicle via first and second hoses, respectively;

a pressure switch that is actuated when a threshold pressure level is detected at said tire pressure gauge, said pressure switch being deactuated when the pressure level at said tire pressure gauge is below said threshold pressure level;

an ambient light sensor for sensing a level of light at said tire pressure gauge; and an illumination source operable to automatically illuminate said pressure indicator in response to (a) actuation of said pressure switch and (b) an output of said ambient light sensor being indicative of a light level below a threshold level.

22. The tire pressure gauge of claim 21, wherein said illumination source is adjustable in response to a change in pressure detected at said tire pressure gauge.

23. The tire pressure gauge of claim 21 including an inlet port for connecting to a pressurized supply hose, said inlet port being selectively in fluid communication with said first and second connector ports in response to adjustment of a user input to control fluid flow between said inlet port and said first and second connector ports.

24. The tire pressure gauge of claim 23, wherein said user input comprises a trigger pivotally attached at said handle, said trigger being selectively pivoted toward said handle by a user to open said at least one valve.

* * * * *